(12) United States Patent
Li (10) Patent No.: US 9,499,641 B2
(45) Date of Patent: Nov. 22, 2016

(54) ALGINATE MONOMER STRUCTURE WITH METAL CRYSTALLITE EMBEDDED, ALGINATE SALT STRUCTURE WITH METAL CRYSTALLITE EMBEDDED AND METHOD OF PRODUCING ALGINATE HYDROGEL WITH METAL CRYSTALLITE INCORPORATED

(71) Applicant: HOPEWANG ENT CO., LTD, Taipei (TW)

(72) Inventor: Yung-Pin Li, Taipei (TW)

(73) Assignee: HOPEWANG ENT CO., LTD, Taipei (TW)

( * ) Notice: Subject to any disclaimer, the term of this patent is extended or adjusted under 35 U.S.C. 154(b) by 7 days.

(21) Appl. No.: 14/277,416

(22) Filed: May 14, 2014

(65) Prior Publication Data

US 2014/0338564 A1 Nov. 20, 2014

(30) Foreign Application Priority Data

May 14, 2013 (TW) .............................. 102117077 A
Apr. 25, 2014 (TW) .............................. 103115090 A (51) Int. Cl.
  *C08B 37/00* (2006.01)
  *C08J 3/075* (2006.01)
  *C08L 5/04* (2006.01)

(52) U.S. Cl.
  CPC ............ *C08B 37/0084* (2013.01); *C08J 3/075* (2013.01); *C08L 5/04* (2013.01); *C08J 2305/04* (2013.01)

(58) Field of Classification Search
  None
  See application file for complete search history.

(56) References Cited

U.S. PATENT DOCUMENTS

| 6,121,441 | A | 9/2000 | Simensen et al. |
| 2002/0137723 | A1 | 9/2002 | Byon et al. |
| 2008/0085295 | A1 | 4/2008 | Melvik et al. |
| 2010/0021552 | A1 | 1/2010 | Hayes et al. |

FOREIGN PATENT DOCUMENTS

| CN | 1261375 A | 7/2000 |
| CN | 1362860 A | 8/2002 |
| CN | 101423564 A | 5/2009 |
| CN | 101463145 A | 6/2009 |
| CN | 101557801 A | 10/2009 |
| CN | 102105524 A | 6/2011 |
| GB | 2435425 A | 8/2007 |
| JP | 2005531647 A | 10/2005 |
| JP | 2011528746 A | 11/2011 |

OTHER PUBLICATIONS

Saha, J. Phys. Chem. C 2009, 113, 7553-7560.*
Definition of Alloy by Merriam-Webster's Learners Dictionary, downloaded from the internet Jun. 17, 2016.*
Torres, Langmuir 2005, 21, 7951-7958.*
Great Britain Intellectual Property Office, "British Search Report", Nov. 14, 2014.
Matsumoto et al. "Viscoelastic Properties of Alginate Aqueous Solutions in the Presence of Salts", Biopolymers, 1990, vol. 29, Matsumoto T. et. al, pp. 1707-1713.
Jeon, et al., "The effect of oxidation on the degradation of photocrosslinkable alginate hydrogels", Biomaterials, May 2012, vol. 33, p. 3503-3514, Elsevier Ltd.

* cited by examiner

*Primary Examiner* — Layla Berry
(74) *Attorney, Agent, or Firm* — WPAT, PC; Justin King (57) ABSTRACT

An alginate monomer structure with metal crystallite embedded includes a first alginate monomer and at least a first metal crystallite. The first alginate monomer is composed of a first uronate molecule and a second uronate molecule, which are linked linearly to each other. A first carbonyl group is formed on a second carbon atom (C2) of the main ring in the first uronate molecule, a carboxyl group is presented on a sixth carbon atom (C6) of the main ring in the second uronate molecule, and a first intramonomer glycosidic linkage is presented between a first carbon atom (C1) of the main ring in the first uronate molecule and a fourth carbon atom (C4) of the main ring in the second uronate molecule. The first metal crystallite is associated between the first uronate molecule and the second uronate molecule.

14 Claims, 11 Drawing Sheets

ALGINATE MONOMER STRUCTURE WITH METAL CRYSTALLITE EMBEDDED, ALGINATE SALT STRUCTURE WITH METAL CRYSTALLITE EMBEDDED AND METHOD OF PRODUCING ALGINATE HYDROGEL WITH METAL CRYSTALLITE INCORPORATED

FIELD OF THE INVENTION

The invention relates to an alginate monomer structure, an alginate salt structure and a forming method thereof, and more particularly to an alginate monomer structure with metal crystallite embedded, an alginate salt structure with metal crystallite embedded, and a method for producing an alginate hydrogel with metal crystallite incorporated.

BACKGROUND OF THE INVENTION

Alginate is a water-soluble natural polysaccharide macromolecule. A commonly used compound is sodium alginate, which can be extracted from the cell walls of brown algae. Alginate is a linear block copolymer composed of (1-4)-glycosidic linked α-L-guluronate (molecular formula $C_6H_8O_6$, abbreviated as G) and its stereoscopic isomer β-D-mannuronate (molecular formula $C_6H_8O_6$, abbreviated as M). The molecular weight of sodium alginate macromolecule ranges from 10,000 to 600,000. Since alginate is an anionic macromolecule, it is easy to form water-insoluble hydrogel by crosslinkage with metallic cations, especially bivalent cations such as calcium ion ($Ca^{2+}$), barium ion ($Ba^{2+}$), or zinc ion ($Zn^{2+}$). Alginate hydrogel is heat-irreversible. The elasticity and stiffness of alginate hydrogel can be adjusted by changing a G/M ratio of the alginate composites.

Since alginate hydrogel is a natural polysaccharide macromolecule, it is extensively used in food, textile and biomedical industries. In the textile and biomedical industries, an alginate fiber made from the alginate hydrogel has a good biocompatibility and ability to chelate heavy metallic cations. Functional fabrics made by adding nutrients or antimicrobial components in the alginate fiber are useful in the field of skin care, cosmetics and medical treatments. For example, since silver ion has a strong antimicrobial activity, a medical dressing made by an alginate fiber containing silver ions provides good anti-inflammatory and protective effects, and thus can promote healing of wounds. Manufacturing methods of alginate fibers containing silver ions mainly include vapour coating, sputter coating, and spinning dope coating silver ions or water-insoluble silver salts on the alginate fibers in post processing. However, silver ions are randomly and unstably scattered about the surface structure of the alginate fiber by the afore-mentioned methods; furthermore, silver ions are also easily deactivated with atmosphere oxidation. Moreover, in order to obtain the best medical effects, the alginate fibers as medical dressing have to be coated with high concentration of silver ions. However, high silver ion content of medical dressing leads to a high risk in biocompatibility and thus is considered not optimal to be used in the human body. Therefore, it is an object of the present invention to provide alginate derivatives, which stably contain low concentration of silver crystallite instead of high concentration of silver ions. Such alginate derivatives can release silver atoms and/or silver ions steadily to effectively destroy pathogen and is safe for human use.

SUMMARY OF THE INVENTION

An object of the invention is to provide an alginate monomer structure with metal crystallite embedded, which contains a first alginate monomer and at least a first metal crystallite. The first alginate monomer is composed of a first uronate molecule and a second uronate molecule linked linearly to each other, wherein a first carbonyl group is formed on a second carbon atom (C2) of the main ring in the first uronate molecule, and a first intramonomer glycosidic bond is presented between a first carbon atom (C1) of the main ring in the first uronate molecule and a fourth carbon atom (C4) of the main ring in the second uronate molecule. At least a first metal crystallite is associated between the first uronate molecule and the second uronate molecule.

Figure 2:
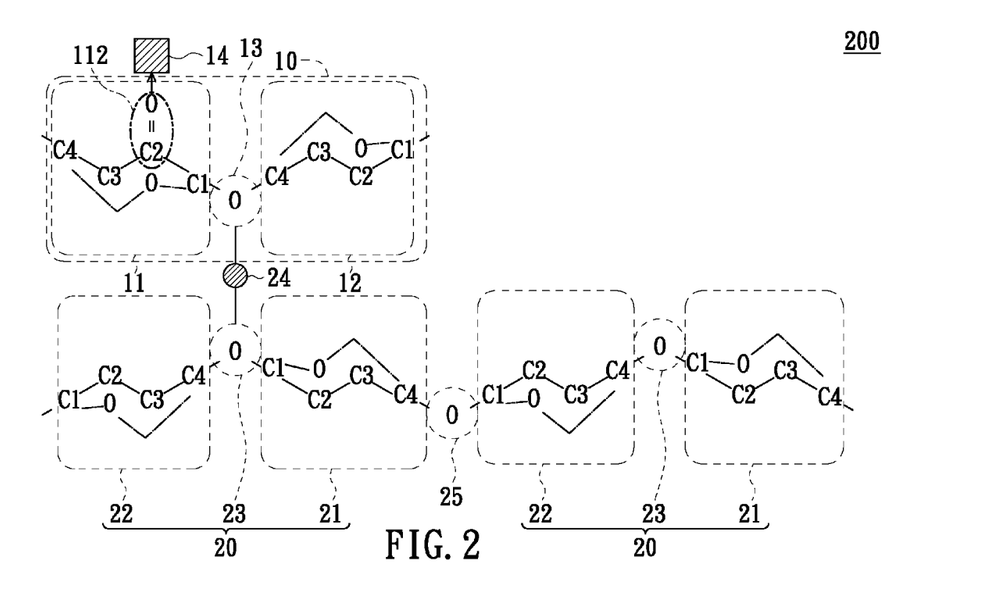
FIG. 2 is a drawing showing a main molecular structure of the alginate salt structure with metal crystallite embedded according to the invention.
Figure 2A:
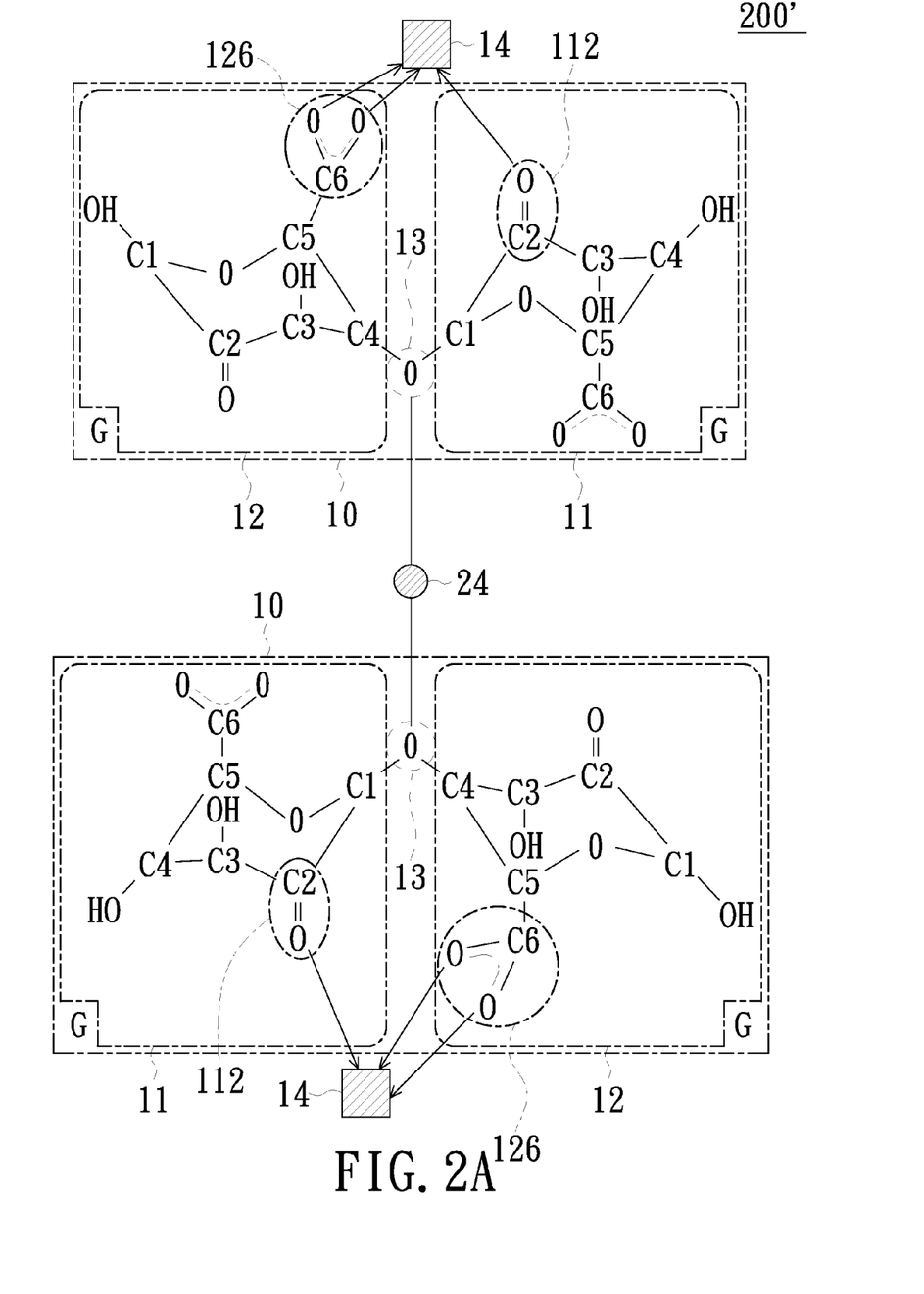
FIGS. 2A-2E are drawings showing different molecular structures of the type I and type II alginate salt structures with metal crystallite embedded according to the invention, respectively.
Figure 2B:
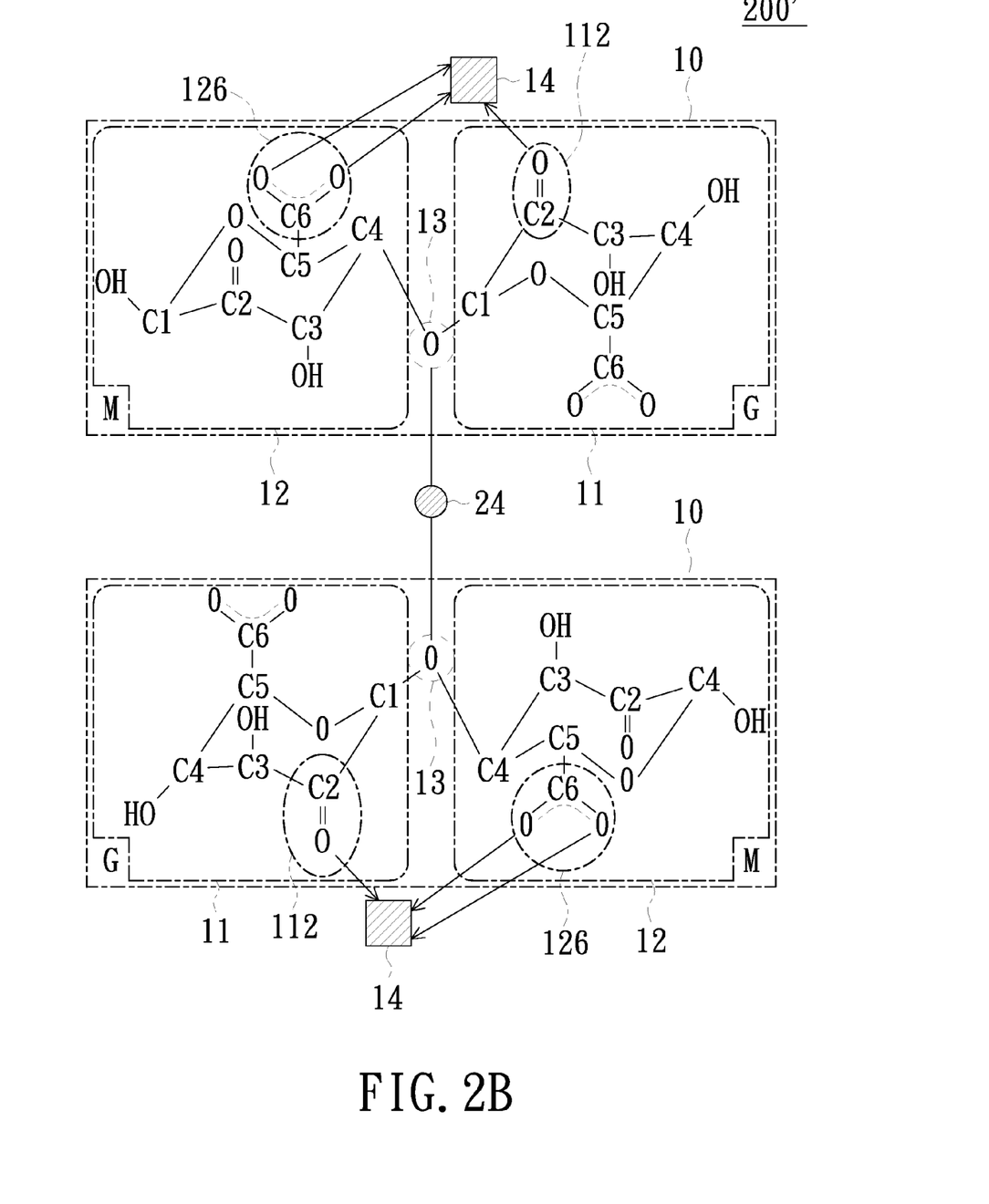
Figure 2C:
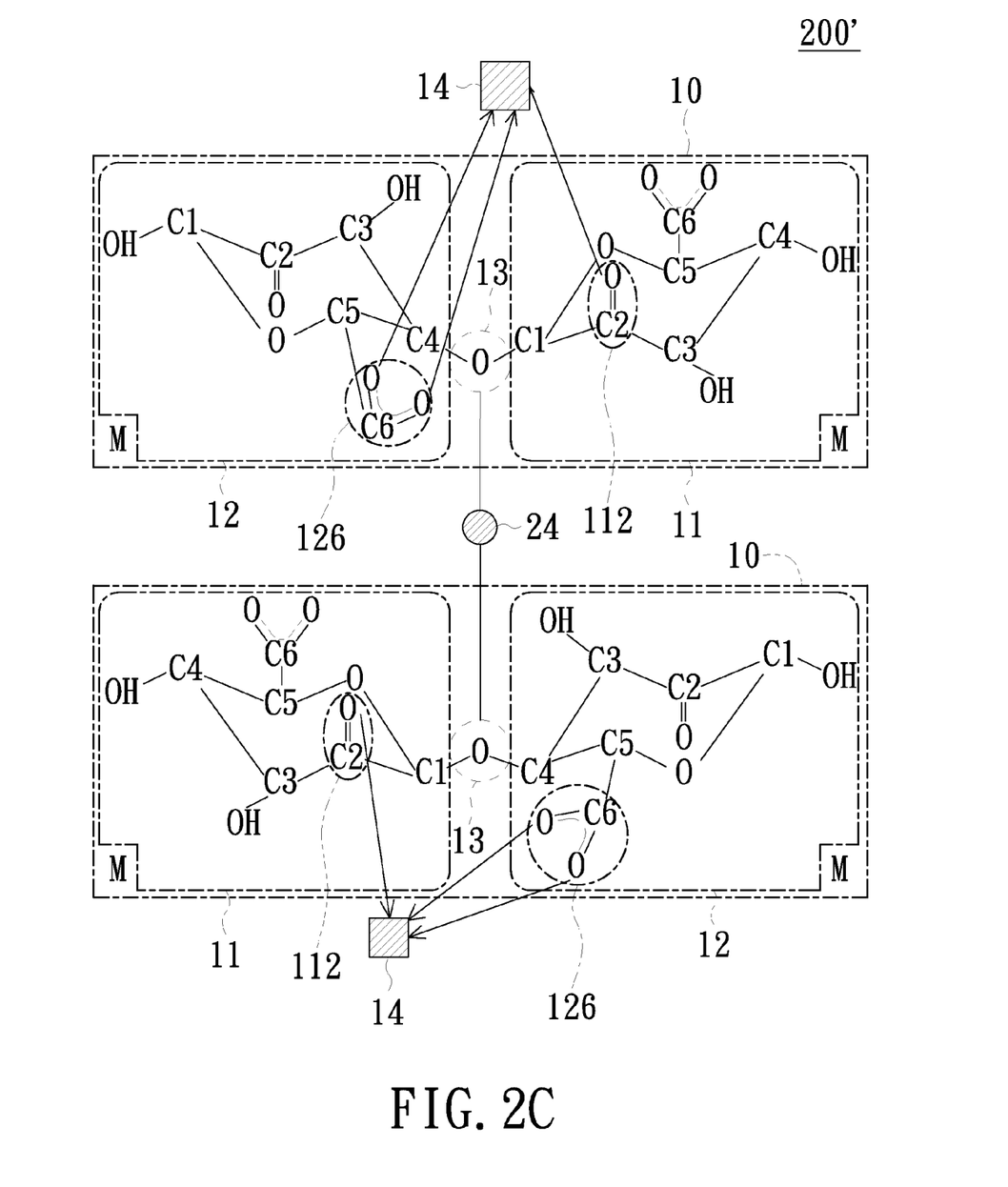
Figure 2D:
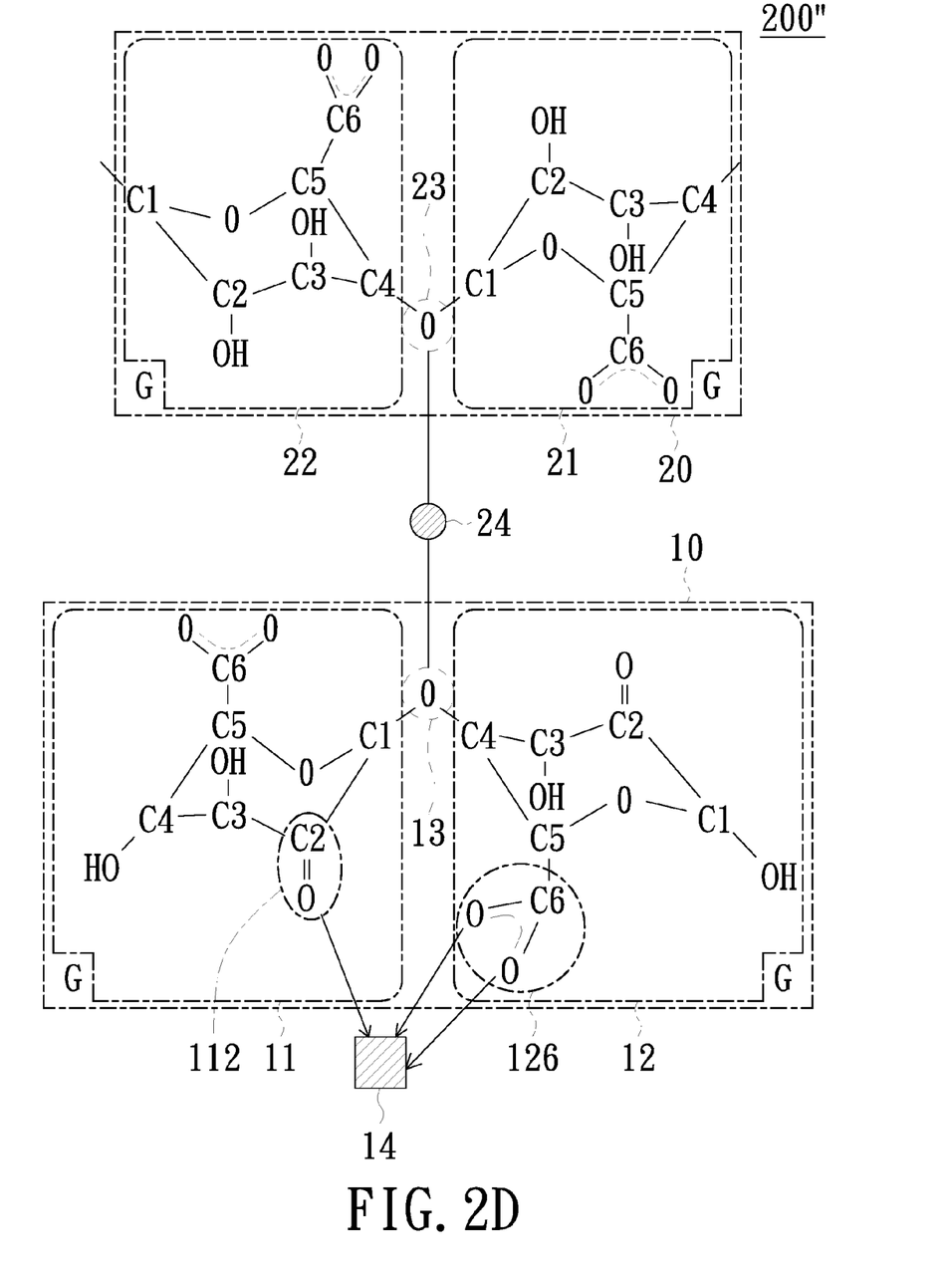
Figure 2E:
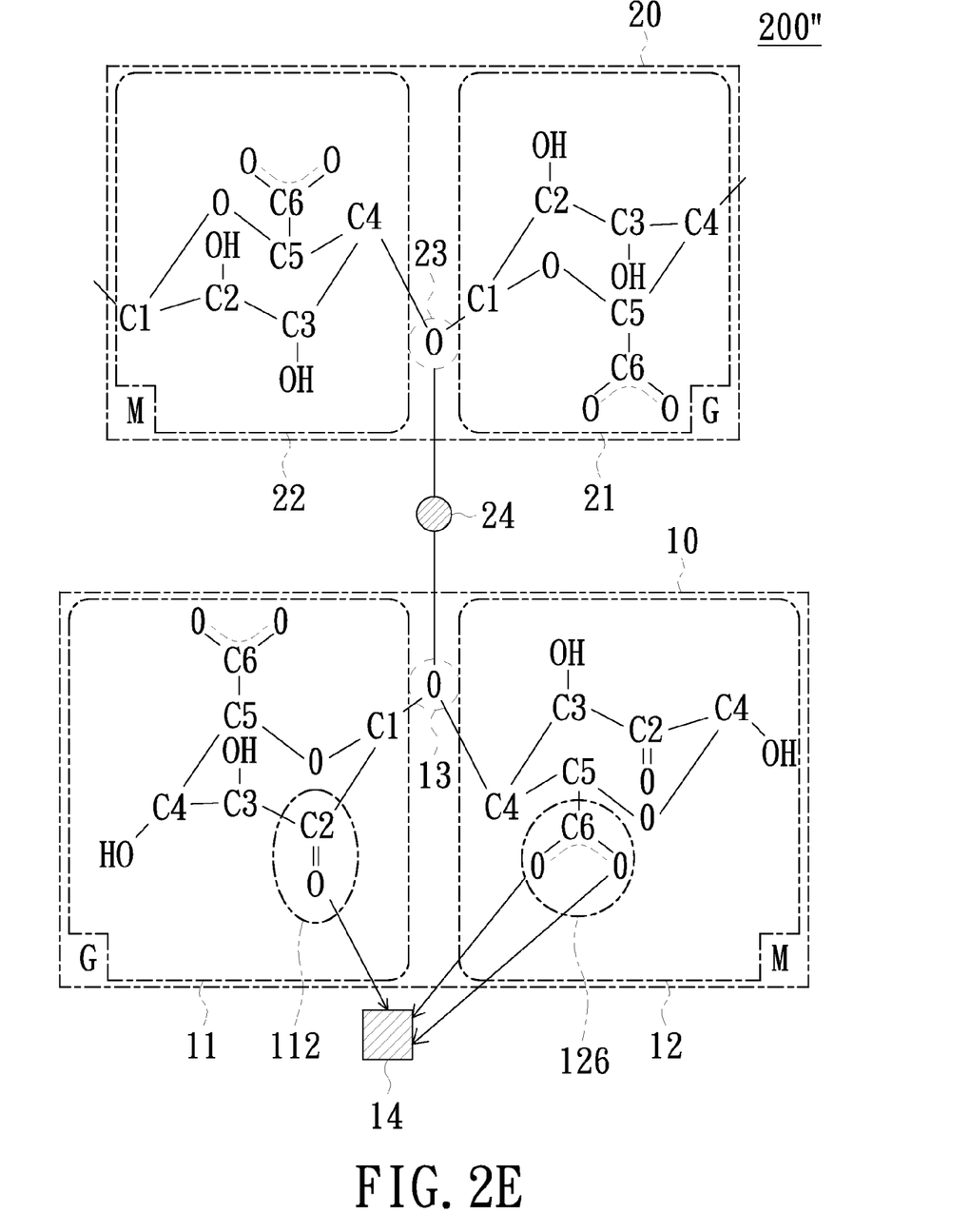

Another object of the invention is to provide an alginate salt structure with metal crystallite embedded, which contains two types of molecular structures. Type I alginate salt structure with metal crystallite embedded, that is, 200' as shown in FIGS. 2A-2C, is composed of two molecules of first alginate monomers as described above, and at least a first metal crystallite and at least a second metallic cation. The two first alginate monomers are linked anti-parallel to each other by at least a second metallic cation between the two first intramonomer glycosidic bonds. At least a first metal crystallite is associated between two uronates of the first alginate monomer. Type II alginate salt structure with metal crystallite embedded, that is, 200" as shown in FIGS. 2D-2E, is composed of a first alginate monomer and a second alginate monomer, and at least a first metal crystallite and at least a second metallic cation. The second alginate monomer is one unit of monomer included in a second alginate macromolecule, which is made up of a plurality of alginate polymers. The second alginate monomer is composed of a third uronate molecule and a fourth uronate molecule linked linearly to each other, wherein a second carbon atom (C2) and a third carbon atom (C3) of the main ring in the third and fourth uronate molecules are all hydroxyl groups, and a second intramonomer glycosidic bond is presented between a first carbon atom (C1) of the main ring in the third uronate molecule and a fourth carbon atom (C4) of the main ring in the fourth uronate molecule. As shown in FIG. 2, a second intermonomer glycosidic bond, that is, 25 is presented between two linear units of second alginate monomers. The first alginate and the second alginate monomer are linked anti-parallel to each other by at least a second metallic cation between the first and the second intramonomer glycosidic bonds. At least a first metal crystallite is associated between two uronates of the first alginate monomer.

A further object of the invention is to provide a method of producing alginate hydrogel with the metal crystallite incorporated. First, a first solution containing at least a first alginate macromolecule is provided. A hydrolyzing agent with a plurality of reduced transition metallic particles as an auxiliary agent is poured in the first solution in order to depolymerize the first alginate macromocule into a plurality of first alginate monomers. Next, the first metallic cations and a reducing agent are added immediately before thermal reaction such that the first metallic cations are reduced to metallic atoms and concomitantly, partial secondary hydroxyl groups, including alternative of C2 or C3 hydroxyl group in an alginate uronate, are oxidized to carbonyl groups in the first alginate monomer so that a plurality of first metal crystallite are formed in the first alginate monomer structure in the first solution. And next, a second alginate macromolecule and a plurality of second metallic cations are added into the afore prepared first solution so that alginate hydrogel with the metal crystallite embedded is formed by cross-linkage of the second metallic cation with the first alginate monomer with the first metal crystallite embedded and the second alginate macromolecule.

According to the invention, since the molecular structure of the alginate monomer is generated and hydroxyl functions are modified to form carbonyl groups, metal crystallite of the specific range in size can be stably associated within the alginate monomer structure, the alginate salt structure and the alginate hydrogel. The alginate hydrogel with metal crystallite incorporated, which is manufactured by the method of the invention, can release metallic atoms and/or metallic ions steadily for a period of time in specific range of pH, and therefore it can be extensively applied to food, textile and biomedical industries.

BRIEF DESCRIPTION OF THE DRAWINGS

Other objects, characteristics and advantages of the invention will become more readily apparent to those ordinarily skilled in the art after reviewing the following detailed description of the preferred embodiments with reference to accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
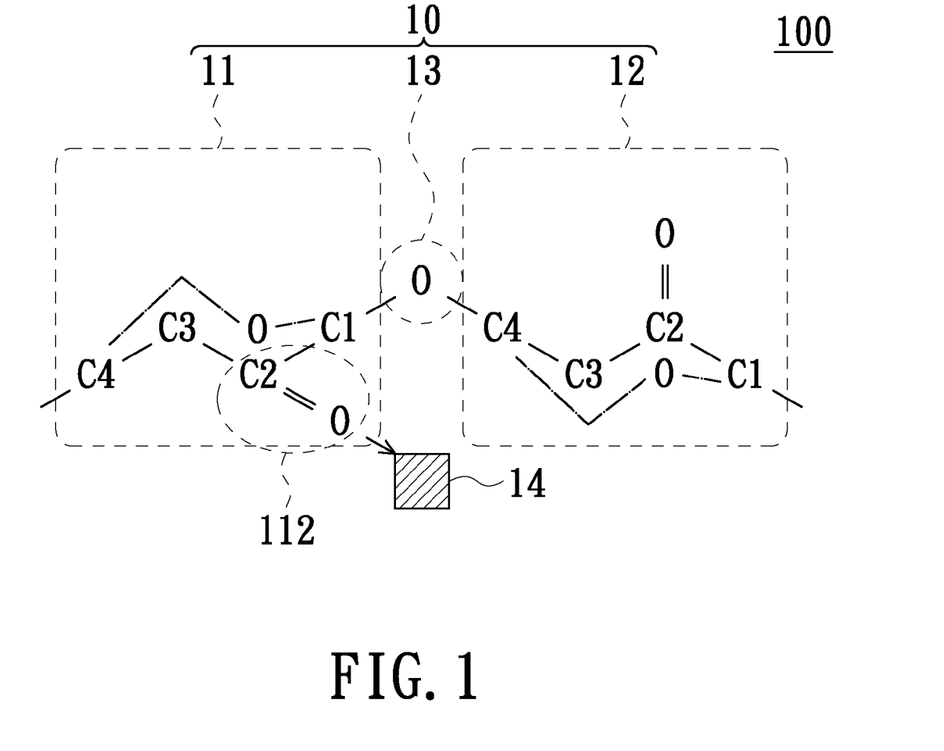
FIG. 1 is a drawing showing a main molecular structure of an alginate monomer structure with metal crystallite embedded according to the invention.

First, FIG. 1 is a drawing showing a main molecular structure of the alginate monomer structure with metal crystallite embedded 100 according to the invention. The alginate monomer structure with metal crystallite embedded 100 according to the invention includes a first alginate monomer 10 and a first metal crystallite 14. The first alginate monomer 10 is composed of a first uronate molecule 11 and a second uronate molecule 12 linked linearly to each other. For convenience of description, only the first to fourth carbon atoms (C1 to C4) of the respective carbon ring in the first uronate molecule 11 and the second uronate molecule 12 are shown in FIG. 1. A first carbonyl group 112 is formed on C2 of the first uronate molecule 11, and a first intra-monomer glycosidic bond 13 is presented between C1 in the first uronate molecule 11 and C4 in the second uronate molecule 12. At least a first metal crystallite 14 is associated between the first uronate molecule 11 and the second uronate molecule 12 (shown as a solid-line arrow in FIG. 1).

Figure 1A:
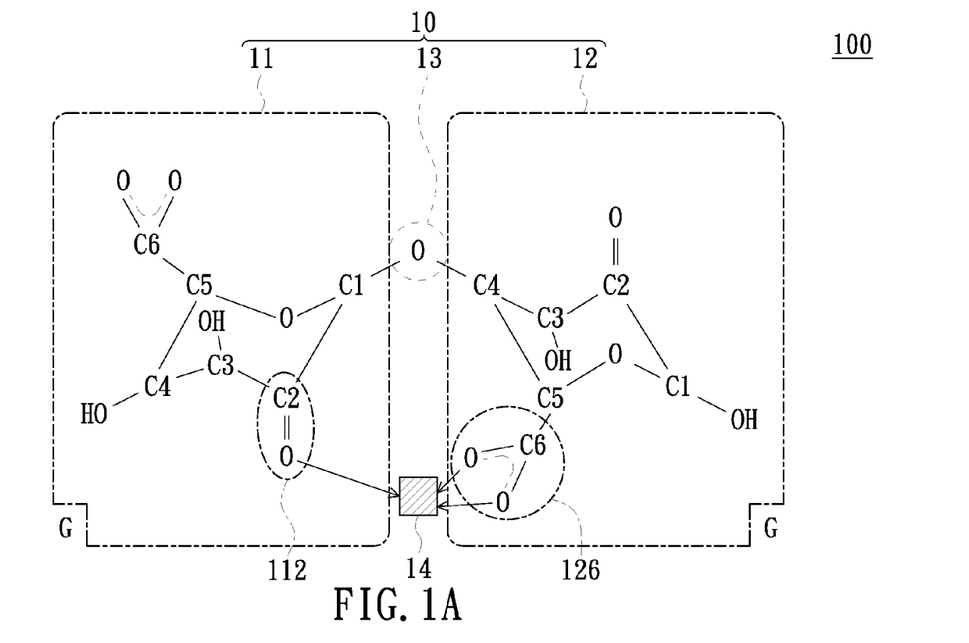
FIGS. 1A-1C are drawings showing three different molecular structures of the alginate monomer structure with metal crystallite embedded according to the invention.
Figure 1B:
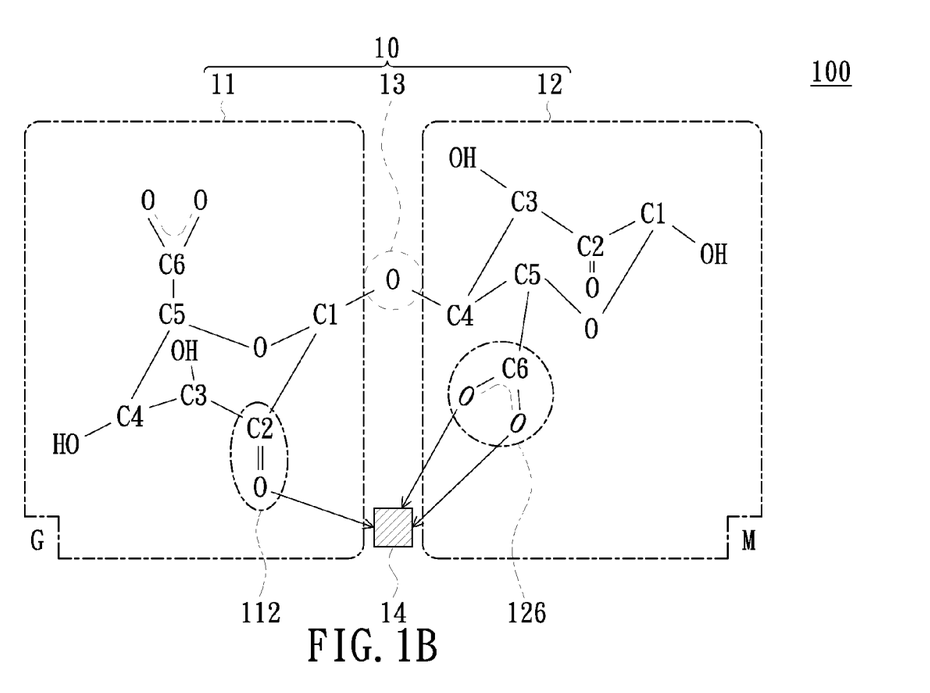
Figure 1C:
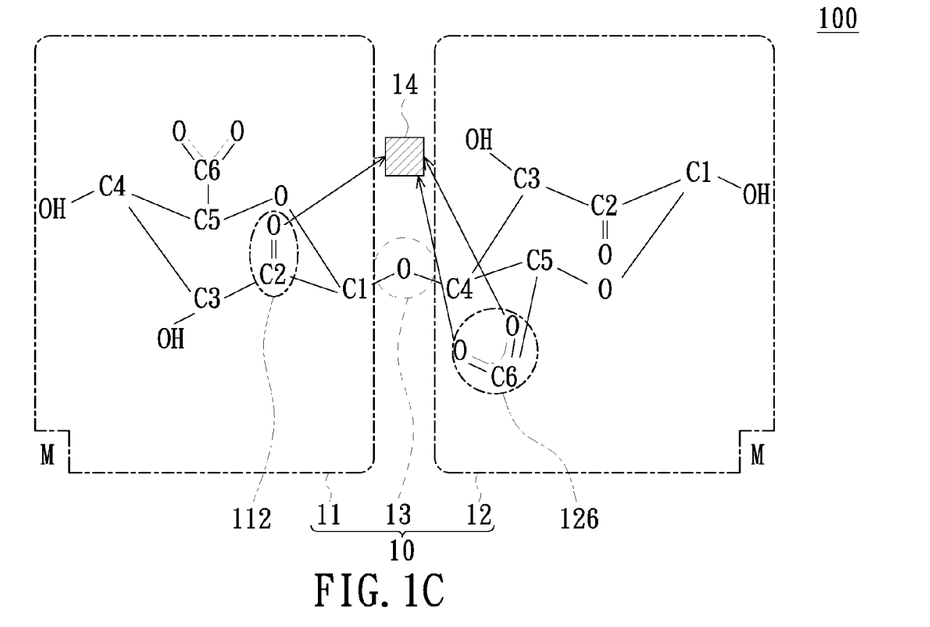

Furthermore, the first uronate molecule 11 and the second uronate molecule 12 can be selected from α-L-guluronate and β-D-mannuronate. Thus the first alginate monomer 10 can be constituted as a G-G, G-M or M-M block structure as shown in FIGS. 1A-1C, respectively. As shown in FIGS. 1A-1C, a carboxyl group is presented on the sixth carbon atom (C6) in each of the first uronate molecule 11 and the second uronate molecule 12 and the dashed line between two oxygen atoms of the carboxyl group indicates a resonance state of a free valence electron pair between the two oxygen atoms.

Referring to FIG. 1A, both of the first uronate molecule 11 and the second uronate molecule 12 are α-L-guluronate. That is, the first alginate monomer 10 is a G-G block structure with an α-1,4-glycosidic linkage. A first carbonyl group (C2=O) 112 is formed on C2 in the first uronate molecule 11, and a first carboxyl group 126 is presented on C6 in the second uronate molecule 12. As shown in FIG. 1A, the first metal crystallite 14 is associated between the first carbonyl group 112 and the first carboxyl group 126 (shown as a solid-line arrow in FIG. 1A).

Next, referring to FIG. 1B, the first uronate molecule 11 is α-L-guluronate and the second uronate molecule 12 is β-D-mannuronate. That is, the first alginate monomer 10 is a G-M block structure with an α-1,4-glycosidic linkage. A first carbonyl group (C2=O) 112 is formed on C2 in the first uronate molecule 11, and a first carboxyl group 126 is presented on C6 in the second uronate molecule 12. As shown in FIG. 1B, the first metal crystallite 14 is associated between the first carbonyl group 112 and the first carboxyl group 126 (shown as a solid-line arrow in FIG. 1B).

Further, referring to FIG. 1C, both of the first uronate molecule 11 and the second uronate molecule 12 are β-D-mannuronate. That is, the first alginate monomer 10 is an M-M block structure with a β-1,4-glycosidic linkage. As shown in FIG. 1C, the first metal crystallite 14 is associated between the first carbonyl group 112 and the first carboxyl group 126 (shown as a solid-line arrow in FIG. 1C).

Further, an alginate salt structure with metal crystallite embedded can be formed by using the alginate monomer structure with metal crystallite embedded 100 of the invention. For convenience of description, FIG. 2 demonstrates a main structure of an alginate salt with metal crystallite embedded 200, among various structures according to the invention. Referring to FIG. 2, the alginate salt structure with metal crystallite embedded 200 according to the invention includes two alginate monomers (two first alginate monomers 10 as type I, or, a first alginate monomer 10 and a second alginate monomer 20 as type II), a second metallic cation 24 and at least a first metal crystallite 14. The second alginate monomer 20 has a molecular structure similar to the first alginate monomer 10 shown in FIG. 1, except that instead of a carbonyl group, a hydroxyl group is presented on C2 or C3 in the second alginate monomer 20. The first metal crystallite 14 is associated with the first uronate molecule 11 and the second uronate molecule 12 of the first alginate monomer 10.

FIGS. 2A-2C are drawings showing examples of the type I alginate salt structures with metal crystallite embedded 200' and FIGS. 2D-2E are drawings showing examples of the type II alginate salt structures with metal crystallite embedded 200". However, the invention is not limited to the examples shown in FIGS. 2A-2E. A carboxyl group is presented on the sixth carbon atom (C6) of the main ring in each of the alginate monomer 10 and the second alginate monomer 20 as shown in FIGS. 2A-2E, and the dashed line between two oxygen atoms of the carboxyl group indicates a resonance state of a free valence electron pair between the two oxygen atoms.

Referring to the type I alginate salt structure with metal crystallite embedded 200' shown in FIG. 2A, the first alginate monomer 10 is a G-G block structure with an α-1,4-glycosidic linkage and the other first alginate monomer 10 is also a G-G block structure. The two alginate monomers are linked anti-parallel to each other by the second metallic cation 24 between the two first intramonomer glycosidic linkages 13, and with linkages of unbound hydroxyl, carbonyl, and carboxyl groups of the two alginate monomers 10 to form a stably condensed egg-box shape. The at least one first metal crystallite 14 is embedded within each first alginate monomer 10.

Next, referring to the type I alginate salt structure with metal crystallite embedded 200' shown in FIG. 2B, the first alginate monomer 10 is a G-M block structure with an α-1,4-glycosidic linkage and the other first alginate monomer 10 is also an G-M block structure. The two alginate monomers 10 are linked anti-parallel to each other by the second metallic cation 24 between two first intramonomer glycosidic linkages 13, and with linkages of unbound hydroxyl, carbonyl, and carboxyl groups of the two first alginate monomers 10. The at least one first metal crystallite 14 is embedded within each first alginate monomer 10.

Further, referring to the type I alginate salt structure with metal crystallite embedded 200' shown in FIG. 2C, the first alginate monomer 10 is an M-M block structure of a β-1,4-glycosidic linkage and the other first alginate monomer 10 is also an M-M block structure. The two alginate monomers 10 are linked anti-parallel to each other by the second metallic cation 24 between two first intramonomer glycosidic linkages 13, and with linkages of unbound hydroxyl, carbonyl, and carboxyl groups of the two alginate monomers 10. The at least one first metal crystallite 14 is embedded within each first alginate monomer 10. The carbonyl linkages with the second metallic cation 24 between the two first alginate monomers 10 may be unstable due to the steric hindrance.

Referring to the type II alginate salt structure with metal crystallite embedded 200'' shown in FIG. 2D, the first alginate monomer 10 is a G-G block structure with an α-1,4-glycosidic linkage and an anti-parallel second alginate monomer 20 is also a G-G block structure. The second alginate monomer 20 can be any G-G dimeric block in the alginate macromolecule. Since the alginate macromolecule is not modified, it is worth noting that a functional group on either C2 or C3 of the second alginate monomer in the alginate macromolecule is a hydroxyl group and a functional group on either C1 or C4 is a glycosidic bond, which is an intermonomer glycosidic bond. The two alginate monomers 10 and 20 are linked anti-parallel to each other by a second metallic cation 24 between two intramonomer glycosidic linkages 13 and 23, and with linkages of unbound hydroxyl, carbonyl, and carboxyl groups of the two alginate monomers 10 and 20, to form a stably condensed egg-box shape. Also, the first metal crystallite 14 is embedded in the first alginate monomer 10.

Next, referring to the type II alginate salt structure with metal crystallite embedded 200'' shown in FIG. 2E, the first alginate monomer 10 is a G-M block structure with an α-1,4-glycosidic linkage and an anti-parallel second alginate monomer 20 is also an G-M block structure The second alginate monomer can be any G-M dimeric block in the alginate macromolecule. It is worth noting that a functional group on either C2 or C3 of the second alginate monomer in the alginate macromolecule is a hydroxyl group and a functional group on either C1 or C4 is a glycosidic bond since the alginate macromolecule is not modified. The two alginate monomers 10 and 20 are linked anti-parallel to each other by a second metallic cation 24 between two intramonomer glycosidic linkages 13 and 23, and with linkages of unbound hydroxyl, carbonyl, and carboxyl groups of the two alginate monomers 10 and 20. The first metal crystallite 14 is embedded within the first alginate monomer 10.

Figure 3:
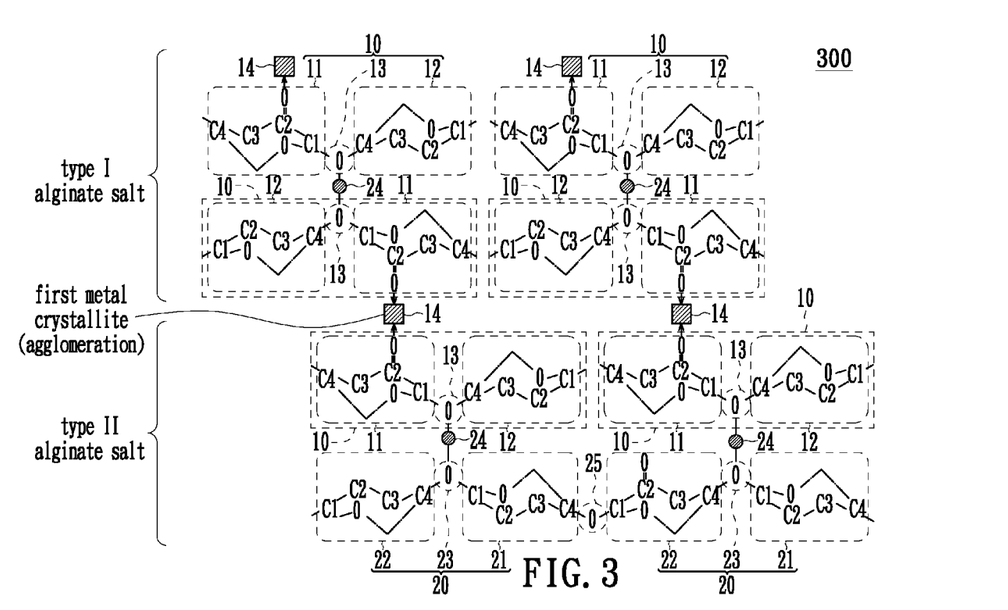
FIG. 3 is a drawing showing a main molecular structure of the alginate hydrogel structure with metal crystallite embedded according to the invention.

FIG. 3 is a drawing showing an example of the alginate hydrogel structure with metal crystallite embedded 300 of the invention. For convenience of description, FIG. 3 demonstrates a main structure of an alginate hydrogel with metal crystallite embedded 300, among various structures according to the invention. Referring to FIG. 3, the alginate hydrogel structure with metal crystallite embedded 300 according to the invention includes molecules of type I alginate salt structure with metal crystallite embedded 200' and type II alginate salt structure with metal crystallite embedded 200'' shown in FIG. 2A-2E.

A method for producing the first alginate monomer structure with metal crystallite embedded 100, the alginate salt structure with metal crystallite embedded 200 and the alginate hydrogel structure with metal crystallite embedded 300 according to the invention will be described hereinafter.

Alginate monomers are able to be generated through a mild acidic or alkaline hydrolysis of the glycosidic bonds between the units of the monomer with different selectivities among G-G, G-M, M-G and M-M blocks rather than random sites within the alginate polymer by depolymerization of sodium alginate macromolecule under hydrothermal conditions. The progressive degradation of an alginate macromolecule to uronates by hydrogen peroxide in the present of iron salts had been documented. Furthermore, studies have indicated that under a weak acidic oxidation condition alginate can be hydrolyzed to form hemiacetalic carbons under hydrogen peroxide treatment and the alginate derivatives does not significantly interfere the formation of ionic junctions with calcium ions. Carbonyl groups in p-benzoquinone interacting with partially positively charged silver nanoparticles by electron affinity ligation to the surface of the nanoparticles were successfully prepared. In such study, p-benzoquinone acted as both a stabilizer and a reducing agent for silver nanoparticles. It is documented that the growth of silver clusters by alginate gel-mediated photochemical method indicates silver clusters can sustain growth with second hydroxyl functions to carbonyl groups of the alginate macromolecule. In that study, the formed silver clusters of the size smaller than 20 nm are not stably associated within the alginate macromolecule, but this claimed method is able to be manipulated as a thermal-chemical synthesis method and applied in the embodiment of this invention for supporting silver particles as an auxiliary agent for oxidizing the alginate macromolecule to alginate monomers.

The alginate monomer with metal crystallite embedded according to the invention can be obtained by the method as follows. First, a first solution containing at least a first alginate macromolecule is provided. The first alginate macromolecule can be a commercially available product of sodium alginate extracted from natural brown algae. The first alginate macromolecule contains a plurality of alginate polymers. The alginate polymer is composed of a plurality of alginate monomers, which links to each other by a plurality of first intermonomer glycosidic bonds. The alginate monomer is any structure of G-G, G-M, M-G or M-M blocks. In this embodiment, the first solution contains 2-12% (w/v) of the first alginate macromolecule, while an M/G ratio in the first alginate macromolecule ranges from 17 to 56%. It is worth noting that in this step, in the first uronate molecule and the second uronate molecule, that is, α-L-guluronate (G) or β-D-mannuronate (M) of the alginate monomer, C2 and C3 are all hydroxyl groups (C—OH).

Next, the first alginate macromolecule is depolymerized in a hydrothermal condition to form a plurality of the first alginate monomers 10 shown in FIGS. 1A-1C. It is notable that the first intermonomer (1-4)-glycosidic bonds, that is, glycosidic bonds between the two alginate monomers, are hydrolyzed to be hydroxyl groups. The hydrolyzing agents in the hydrothermal condition utilized here can be selected from the following.

(1) sodium hydroxide or potassium hydroxide at 15-25% (w/w) relative to the first alginate macromolecule as a mild alkaline hydrolyzing agent.

(2) a mild acidic solution at pH 3.5-6.5 mixed with auto-oxidative compounds, such as hydrogen peroxide, ascorbate, sulphites or polyphenols at 0.1-3% (w/w) relative to the first alginate macromolecule as a mild acidic hydrolyzing agent.

Reduced metallic particles at 0.1-1.0 mM can be selectively added as an auxiliary agent. Here, metallic particles are clusters of metallic atoms, so that the metallic atoms in combination with the auto-oxidative compound act as a coupling redox catalyst agent. The metallic particles are selected from transition metals such as zinc (Zn), iron (Fe), copper (Cu), silver (Ag), or gold (Au).

In this embodiment, a mild acidic solution mixed with hydrogen peroxide are used as the hydrolyzing agent and silver particles as the auxiliary agent, wherein silver particles are obtained by an electrolytic reduced method or thermal-chemical synthesis with alginate gel-mediated growth method. In details, the latter method is operated hereby as that the first solution is adjusted to pH 4.5-6.5 by a mild acidic solution and then 0.1-1.0 mM silver cations are added immediately before the reaction is performed for 0.5-4.0 hours under 55-130° C. After silver particles are prepared in the first solution as an auxiliary agent, the mild acidic hydrolyzing agent are added to react with the first alginate macromolecule for 0.5-4.0 hours under 40-90° C. In this way, a plurality of first alginate monomers depolymerized from the first alginate macromolecule are acquired and simultaneously partial C2 hydroxyl groups are oxidized to C2 carbonyl groups and silver particles are ultimately transformed to silver cations. It is notable that since silver particles can be used as a redox catalyst agent by coupling with hydrogen peroxide. Depending on the reaction condition and proportion of the hydrogen peroxide to alginate macromolecule, the first alginate macromolecule is depolymerized to alginate oligomers or alginate monomers, even to molecules of glycerate and pyruvate, which are depolymerized from mannuronates. In this embodiment, the molecules of mannuronate in the first alginate macromolecule are ultimately depolymerized to molecules of glycerate and pyruvate. Since small molecules of glycerate or pyruvate contain carbonyl and/or carboxyl groups, they are able to facilitate the first metal crystallite to be stable in the first alginate monomer in the first solution.

Next, first metallic cations are added to the first solution. It is preferable that the first metallic cations are selected from transition metallic cations such as zinc (Zn), iron (Fe), copper (Cu), silver (Ag), or gold (Au) cations. It is preferable that the concentration of the first metallic cations added to the first solution is 0.1-3 mM. The first metallic cations can be obtained from a solution containing a compound of the transition metal. The compound of the transition metal dissociates to release first metallic cations when dissolved in water. In this embodiment, silver nitrate ($AgNO_3$), silver carbonate ($Ag_2CO_3$) and/or silver acetate ($AgC_2H_3O_2$) solution is selected as the first metallic cation solution. Because silver particles are selected as the auxiliary agent at prior reaction of depolymerization, this step can be selectively neglected in this embodiment.

Next, under an appropriate reaction condition, a reducing agent is added to the afore prepared first solution so that the first metallic cations are gradually reduced to metallic atoms, and concomitantly C2 or C3 hydroxyl groups are oxidized to form carbonyl groups in the first alginate monomer. The reaction of oxidation of C2 or C3 hydroxyl to carbonyl function groups provides reducing power to reduce metallic cations to metallic atoms to coordinate to the C2 carbonyl group, wherein at least a C2 hydroxyl group of the first uronate molecule 11 (G or M) in the first alginate monomer 10 is oxidized to form the first carbonyl group 112. Since the oxygen atom of the first carbonyl group has two pairs of non-bonding valence electrons and the first metallic cations have empty electron orbits, the first carbonyl group attracts the first metallic cations in the first solution to coordinate to the oxygen atom of the first carbonyl group. Gradually, the first metal crystallite is constructed on the first carbonyl group with a plurality of first metallic atoms under a reduction reaction of first metallic cations. In details, with the effect of the reducing agent and affiliating with carboxyl group 126 of the second uronate 12 as a stabilizer, the first metallic cation coordinated to the first carbonyl group 112 is then promptly reduced to form the bonding type first seed metal, while the first metallic cations not coordinated to the first carbonyl group 112 are reduced as soluble free type first metallic atoms. With coexistence of the first seed metal, the free type first metallic atoms naturally and promptly agglomerate the first seed metal associated to the first carbonyl group 112 to form the first metal crystallite so that the first metal crystallite is stably embedded in the first alginate monomer structure 100. In this embodiment, the reducing agent can be selected from sodium borohydride ($NaBH_4$), ascorbate, glucose, sucrose, starch, alginate, carboxymethyl cellulose (CMC), or citrate. The reducing agent is added at 2-30% (w/v) relative to the first solution at pH 4.5-6.5 and then the reaction solution is stirred for 1-4 hours under 55-130° C. such that the first metallic cations are transformed to free type first metallic atoms and the first metal crystallite 14 on the first carbonyl group 112 of the first alginate monomer 10 as shown in the alginate monomer structure 100 in FIGS. 1A-1C. By the method according to the invention, since the first metal crystallite constructed in the alginate monomer structure can stably associate to the modified functional group, the crystallite size can be up to 20 nm or more, even up to a range of 50-250 nm with agglomeration of the first metal crystallite incorporated in the first alginate monomers. In order to clean residual free type first metallic atoms or particles in the first solution, appropriate oxidant such as hydrogen peroxide can be selectively used.

As for stabilization of first metal crystallite in the first alginate monomer structure, not only C2 carbonyl group of the first uronate, but also C6 carboxyl group of the second uronate in the first alginate monomer is indispensable. Moreover, since few of molecules of the first alginate monomers constitute envelope by agglomeration of smaller metal crystallite, in which the center is the first metal crystallite, to enclose the first metal crystallite in the first solution, the first metal crystallite is well stably embedded in the envelope structure constituted with the first alginate monomers, in terms of oxidation resistance to oxidant treatment.

Next, a second alginate macromolecule is added to the first solution. The second alginate macromolecule can be a commercially available product of sodium alginate extracted from natural brown algae. The second alginate macromolecule is polymerized by a plurality of second alginate monomers, wherein the molecular weight of the second alginate macromolecule can be greater than the molecular weight of the first alginate macromolecule. Each of the second alginate monomers is composed of a third uronate molecule 21 and a fourth uronate molecule 22 linked linearly to each other. The third uronate molecule 21 and the fourth uronate molecule 22 are selected from α-L-guluronate (G) or β-D-mannuronate (M), respectively. Each of the second alginate monomers is also a G-G, G-M or M-M block. In this embodiment, the concentration of the second alginate macromolecule added to the first solution is about 3-15% (w/w). Next, the second alginate macromolecule is added to the afore prepared first solution and mixed sufficiently. A small amount of acid solution can be selectively added so as to adjust the mixed solution to about pH 4.5-5.5, such that the first metal crystallites are stabilized in the solution.

Next, the second metallic cation is added. The second metallic cation is preferably selected from bivalent metallic cations such as calcium ion ($Ca^{2+}$), copper ion ($Cu^{2+}$), strontium ion ($Sr^{2+}$), barium ion ($Ba^{2+}$), or zinc ion ($Zn^{2+}$), which can coordinate with the alginate monomer to construct a complex structure. A solution of a compound of the aforementioned metals can be used as a source of the second metallic cations. Since the alginate molecule becomes an anionic molecule when dissolved in water, the added bivalent second metallic cations coordinate immediately to the carboxyl groups of the first alginate monomer and the second alginate macromolecule, and adjacent carbonyl, hydroxyl and glycosidic groups which are not yet associated with the first metallic cations are coordinated such that an alginate hydrogel with first metal crystallite incorporated is established. The alginate hydrogel with metal crystallite incorporated, which is manufactured by the method according to the present invention, contains a plurality of the alginate salt structures 200' and/or 200" containing the first metal crystallite 14 shown in FIGS. 2A-2E. In this embodiment, a calcium chloride solution is used as the second metallic cation solution. It is preferably that the concentration of the second metallic cations added to the first solution is 5-10% (w/v). The calcium alginate hydrogel with silver crystallite incorporated can be post processed to be calcium alginate fibers associated with silver crystallite by injection through a nozzle and extension. Alternately, the calcium alginate hydrogel with silver crystallite incorporated can be dried to form calcium alginate powders with silver crystallite incorporated. The afore-mentioned calcium alginate hydrogel can be further processed to other products such as a film. A method for processing the fibers or film is not limited and will not be further described hereinafter.

In summary, the metal crystallite formed in the alginate hydrogel by the method of the invention has a crystal size of 20 nm or even 50-250 nm. It can gradually release metallic atoms under specific conditions. Specifically, since acid dissociation constant (pKa) of the first alginate monomer is smaller than 4, the carboxyl group of the first alginate monomer is protonated in a mild acidic solution of about pH 5.5-6.5, which is equivalent to the normal acidity of human epidermis so that the first metallic atoms and/or metallic cations are gradually released from the first metal crystallite. For example, when a calcium alginate dressing incorporated with silver crystallite made by the method of the invention is applied to a wound in the human body, silver metallic atoms and/or silver cations can be sustainably released for a duration of time since silver crystallite with a size of 20-250 nm is stably embedded in the alginate monomer structure. In this way, the effects of anti-inflammatory, disinfection, protection, healing promotion and so on can be achieved with effects of silver atoms or cations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An alginate monomer structure with metal crystallite embedded, comprising:
   a first alginate monomer composed of a first uronate molecule and a second uronate molecule linked linear to each other, wherein a first carbonyl group is formed on a second carbon atom (C2) of a main ring in the first uronate molecule, and a first intramonomer glycosidic linkage is presented between a first carbon atom (C1) in the first uronate molecule and a fourth carbon atom (C4) in the second uronate molecule; and
   at least a first metal crystallite associated between the first uronate molecule and the second uronate molecule,
   wherein the first uronate molecule and the second uronate molecule are selected from α-L-guluronate or β-D-mannuronate, respectively, and the at least a first metal crystallite has a size ranging from 50 nm to 250 nm.

2. The alginate monomer structure with metal crystallite embedded according to claim 1, wherein a first carboxyl group is presented on the second uronate molecule, and the at least a first metal crystallite is associated between the first carbonyl group and the first carboxyl group.

3. The alginate monomer structure with metal crystallite embedded according to claim 1, wherein the at least a first metal crystallite is adapted from transition metallic cations; zinc (Zn), iron (Fe), copper (Cu), silver (Ag), or gold (Au) cations.

4. An alginate salt structure with metal crystallite embedded, comprising a type I alginate salt structure with metal crystallite embedded and/or a type II alginate salt structure with metal crystallite embedded, wherein:
   the type I alginate salt structure with metal crystallite embedded comprises: two first alginate monomers as described in claim 1 which are linked anti-parallel to each other, at least a second metallic cation associated between two first intramonomer glycosidic linkages, and at least a first metal crystallite embedded within any one of the first alginate monomers; and
   the type II alginate salt structure with metal crystallite embedded comprises: a first alginate monomer as described in claim 1 and a second alginate monomer, which are linked anti-parallel to each other, and the second alginate monomer is composed of a third uronate molecule, a fourth uronate molecule and a second intramonomer glycosidic linkage; at least a second metallic cation associated between the first and second intramonomer glycosidic linkages, and at least a first metal crystallite embedded within the first alginate monomer, wherein the first uronate molecule, the second uronate molecule, the third uronate molecule and the fourth uronate molecule are selected from α-L-guluronate or β-D-mannuronate, respectively, and the at least a first metal crystallite has a size ranging from 50 nm to 250 nm.

5. The alginate salt structure with metal crystallite embedded according to claim 4, wherein the at least a first metal crystallite is adapted from zinc (Zn), iron (Fe), copper (Cu), silver (Ag), or gold (Au).

6. The alginate salt structure with metal crystallite embedded according to claim 4, wherein the at least a second metallic cation is selected from calcium ion ($Ca^{2+}$), copper ion ($Cu^{2+}$), strontium ion ($Sr^{2+}$), barium ion ($Ba^{2+}$), or zinc ion ($Zn^{2+}$).

7. A method of producing an alginate hydrogel with metal crystallite incorporated, comprising the steps of:
providing a first solution containing at least a first alginate macromolecule;
depolymerizing the first alginate macromolecule into a plurality of the first alginate monomers as described in claim 1 with a mild alkaline or acidic hydrolyzing agent;
adding a plurality of first metallic cations and reducing agents into the first solution under a hydrothermal condition so as to reduce the first metallic cations into a plurality of first metal crystallites in the first alginate monomers;
adding a plurality of second metallic cations and at least a second alginate macromolecule into the first solution; and
forming an alginate hydrogel by reaction of the first alginate monomers containing the first metal crystallites, the at least a second alginate macromolecule and the second metallic cations, wherein the alginate hydrogel includes a plurality of the alginate salt structures with metal crystallite embedded according to claim 4.

8. The method according to claim 7, wherein the step of depolymerizing the first alginate macromolecule into the first alginate monomers includes adding at least a hydrolyzing agent and selectively with metallic particles as an auxiliary agent coupling with an auto-oxidative agent as a redox catalyst agent.

9. The method according to claim 7, wherein the mild alkaline hydrolyzing agent is a solution of sodium hydroxide or potassium hydroxide; and the mild acidic hydrolyzing agent is a solution with auto-oxidative agent of hydrogen peroxide, ascorbate, sulphites or polyphenols.

10. The method according to claim 7, wherein the formed alginate hydrogel including a plurality of the alginate salt structures with metal crystallite embedded is constituted with the at least a second alginate macromolecule as a template for constructing the type II alginate salt structure with metal crystallite embedded according to claim 4, and the embedded first metal crystallite as a center for the type I alginate salt structure with metal crystallite embedded according to claim 4 to be constructed.

11. The method according to claim 9, wherein the first metallic cations are selected from zinc (Zn), iron (Fe), copper (Cu), silver (Ag), or gold (Au) cations.

12. The method according to claim 9, wherein the second metallic cations are selected from calcium ions ($Ca^{2+}$), copper ions ($Cu^{2+}$), strontium ions ($Sr^{2+}$), barium ions ($Ba^{2+}$), or zinc ions ($Zn^{2+}$).

13. The method according to claim 7, wherein during the step of reducing the first metallic cations into the a plurality of first metal crystallites formed in the first alginate monomers,
the first carbonyl groups are formed by oxidation of C2hydroxyl groups with the hydrolyzing agent and/or concomitant with redox reaction of the first metallic cations, which are restricted by surrounding carboxyl groups and reduced to metallic atoms;
a part of the first metallic cations are associated to the first carbonyl groups by reaction of the added first metallic cations with the formed first carbonyl groups;
the first metallic cations associated to the first carbonyl groups are reduced to form a plurality of first seed metals and the residual first metallic cations are reduced to form a plurality of free form first metallic atoms by reaction with an added reducing agent under a hydrothermal condition; and
the plurality of first metal crystallites are formed by agglomerating of the free form first metallic atoms on the first seed metals.

14. The method according to claim 13, wherein the added reducing agent is selected from sodium borohydride, ascorbate, glucose, sucrose, starch, alginate, carboxymethyl cellulose, or citrate.

* * * * *